Feb. 27, 1962  L. R. MAXWELL  3,023,310
METHOD AND MEANS FOR DETECTING SUBMARINES
Filed July 12, 1955  3 Sheets-Sheet 1

INVENTOR
LOUIS R. MAXWELL

BY
ATTORNEYS

Feb. 27, 1962   L. R. MAXWELL   3,023,310
METHOD AND MEANS FOR DETECTING SUBMARINES
Filed July 12, 1955   3 Sheets-Sheet 2
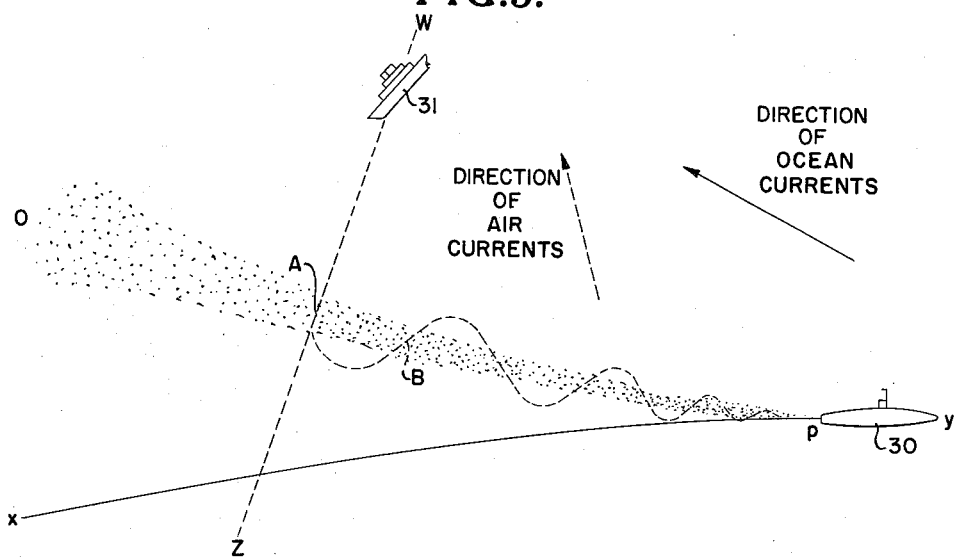
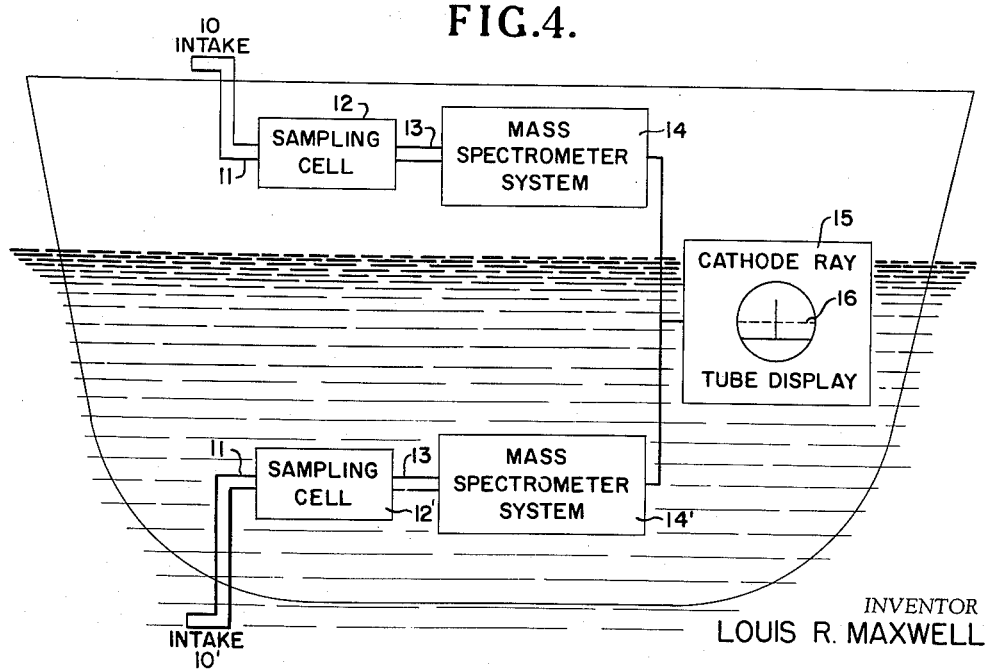
INVENTOR
LOUIS R. MAXWELL Feb. 27, 1962 L. R. MAXWELL 3,023,310
METHOD AND MEANS FOR DETECTING SUBMARINES
Filed July 12, 1955 3 Sheets-Sheet 3
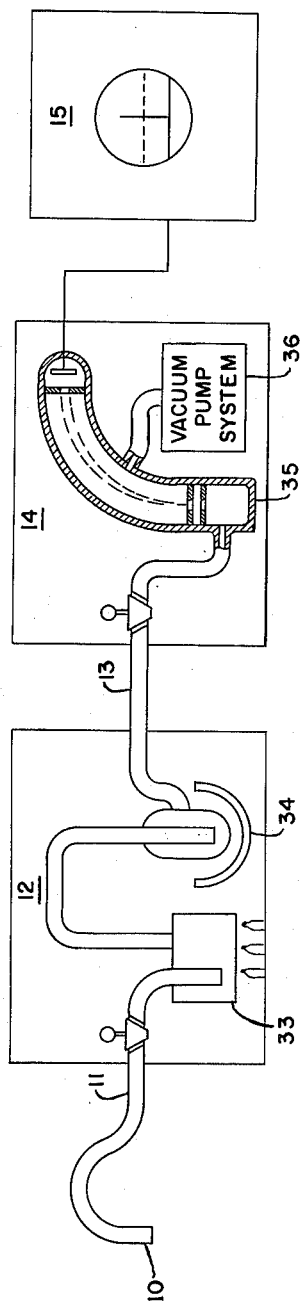
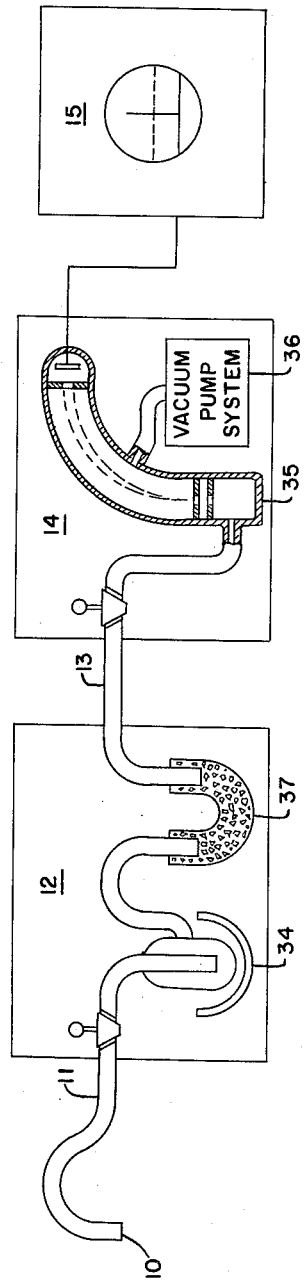
INVENTOR.
LOUIS R. MAXWELL
BY
ATTYS United States Patent Office 3,023,310
Patented Feb. 27, 1962

3,023,310
METHOD AND MEANS FOR DETECTING SUBMARINES
Louis R. Maxwell, 3506 Leland St., Chevy Chase, Md.
Filed July 12, 1955, Ser. No. 521,651
2 Claims. (Cl. 250—43.5)
(Granted under Title 35, U.S. Code (1952), sec. 266)

The invention described herein may be manufactured and used by or for the Government of the United States of America for governmental purposes without the payment of any royalties thereon or therefor.

The present invention relates to the method and means for detecting and geographically locating a source of a selected gaseous material. More specifically it relates to the detection and location of submarines from the analysis of the gases emitted from the submarine. It is to be understood that the present invention is capable of much wider use and is not to be construed as being restricted to use with submarines.

Previously several methods have been devised for detecting submarines. They include visual methods, use of radar and acoustical methods and magnetic methods. Each of these prior art methods of detection has certain disadvantages, for example, the visual method is ineffective at night and under adverse weather conditions. Furthermore it is restricted to rather short ranges because of the small size of the exposed portion of the submarine and the curvature of the earth involved. Also the visual method cannot be used effectively for detecting submarines which have submerged. As for radar, it is ineffective for the same reasons that visual methods are ineffective. The acoustic methods have inherent difficulties in the noises which are produced in the water from other sources and from the unpredictable reflections of the sound waves in the water. As to the magnetic method the detector must be brought within close range of the submarine such so that the detection and location are practically simultaneous and local unknown anomalies in this magnetic field make detection difficult in some cases.

The present invention avoids the difficulties of the prior art by depending on an entirely different principle of operation for its detection and location of the submarine. The present invention relies upon a characteristic which is inherent in submarines in that most submarines travel under the power of an internal combustion engine except for short periods of time. It is the gas emitted by this internal combustion engine which forms the basis of the present method of detection and location of the submarine.

The present invention could also have application in the detection and location of any source of a selected material where the source emits the particular material at a substantially constant rate over a period of time sufficient to produce a detectable trail. Such trails may result from either the movement of the source or the effects of movements of the fluid medium surrounding the source, for example the effects of a prevailing wind or of a known ocean current. A further application of the apparatus of the present invention would provide a means of identification. This could be accomplished by providing a known substance to be emitted into the surrounding fluid medium from such things as internal combustion engines or the burners of steam boilers of submarines, surface vessels, and aircraft.

It is an object of the present invention to provide an apparatus for detection and location of a source of a selected gaseous material.

A further object of this invention is to provide a means of identification for friendly activities.

Another object of the present invention is to provide a method of detecting submarines.

Another object of the present invention is to provide a new and improved means for detecting the presence of a submarine.

Another object of the present invention is to provide a new and improved method for locating a submarine.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 3 is a diagram illustrating the method of the present invention;

FIGURE 4 is a diagrammatic representation of the system of the present invention using both air and water intakes;

FIG. 5 is a diagrammatic view showing some details of the sampling cell and of the spectrometer system for a water sample; and FIG. 6 is a view similar to FIG. 4 for an air sample.

Figure 1:
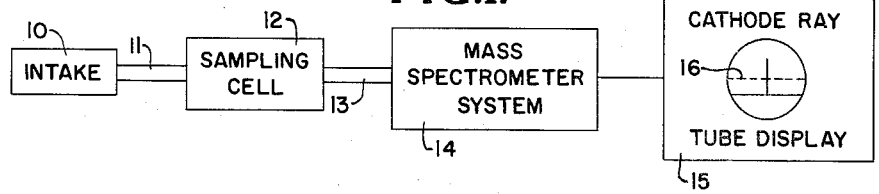
FIGURE 1 is a diagrammatic representation of an apparatus suitable for performing the method of the present invention.
Figure 2:
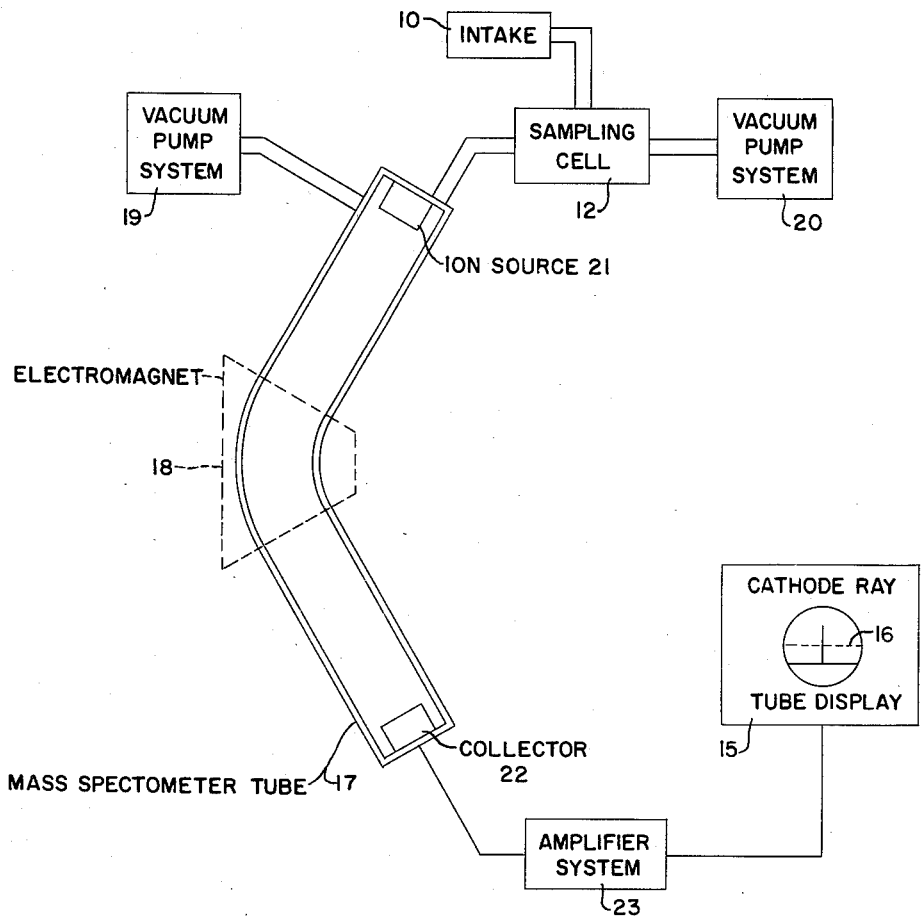
FIGURE 2 is a diagrammatic representation showing the application of the mass spectrometer to the system of the present invention.

Referring now to the drawings wherein like reference characters designate like corresponding parts throughout the several views there is shown in FIG. 1 a block diagram of the apparatus of the present invention. Each of the blocks represents a substantially conventional piece of apparatus of the type designated. The system comprises an intake 10 which may be any suitable scoop or pipe for securing a sample from the fluid, which fluid is continuous between the source of the selected material and the sampling intake 10, for example, the atmosphere or large bodies of water in which both the source and the detector intake are immersed. The sampling cell 12 is connected to the intake 10 by a conduit 11. This sampling cell functions to prepare the sample for introduction into the mass spectrometer system 14 through conduit 13. In cell 12 the gas is separated from any accompanying moisture while in the spectrometer system 14 the gas will be introduced into the spectrograph tube under a vacuum condition as shown on FIG. 2. The sample could have water vapor removed by either using suitable hydroscopic materials as taught in the Patent 2,393,650 to Metcalf or by using a condensation trap as taught in chapter eleven of the book "Vacuum Manipulation of Volatile Compounds" by Robert Thomas Sanderson, published by John Wiley and Sons, Inc. in 1948. It may be noted that the patent to Metcalf also teaches that it is old to use a condensation trap.

Referring to FIG. 5, the intake 10 is connected to introduce the sample into the sample cell 12 where, for a water sample, the water is vaporized by heat at 33 and passed into a condensation trap 34 which may be cooled by liquid air, liquid nitrogen, solid carbon dioxide, etc., which will condense out any water vapor. By suitable adjustment of the temperature of the trap the desired component of the gas may be separated from the water vapor and to some extent from other gases which may be present. The gas passed by the trap is introduced into the mass spectrometer 35 which has its vacuum maintained by the pump system 36.

The system shown in FIG. 6 shows the use of both the condensation trap 33 and hydroscopic agents, such as the well-known anhydrous calcium chloride, at 37. The remainder of the system of FIG. 6 is the same as that of FIG. 5. For a continuous flow operation the vacuum system of the sampling cell 12 and the vacuum system of the spectrometer tube would be adjusted to give the proper residual vacuum in the tube. The spectrometer system 14 has its output applied to a cathode ray display tube 15 on which a reference line 16 has been scribed. This reference line is employed to indicate when the quantity of the selected material exceeds a predetermined background level.

The mass spectrometer system includes generally a mass spectrometer tube 17, having an electromagnet 18 for deflecting the electron beam and having the attendant necessary vacuum pumping system such as at 19 and 20. The pump at 19 maintains the proper vacuum within the tube 17 while pump 20 evacuates the sampling input system for the tube. Connected with the collector electrode 22 of the spectrometer tube 17 is an amplifying system 23 which feeds into an indicator or recording system. An indicating system suitable for the purpose is drawn as a cathode ray tube system although other indicators could be employed or the indication could be automatically recorded by conventional recording equipment.

In operation the sample is picked up by intake 10, FIG. 1, and introduced into sampling cell 12 through a conduit 11. In cell 12 the sample is prepared for introduction into the spectrometer system by removing some of the undesired components, such as moisture. It is then introduced into the mass spectrometer tube 17, FIG. 2, and ionized at 21. The beam of ions is deflected by the electromagnet 18 in proportion to the mass of the ion of which the beam is composed. The selected ion is collected at 22 and the resulting charge is passed through an amplifier 23 and applied to the recording system 15, which is shown as a cathode ray system, FIGS. 1, 2 and 4.

It should be understood that the method of this invention can be carried out by a chemical analysis system, but such a chemical system would not be as sensitive as the mass spectrometer nor would it be as fast in operation.

The description of the method employing this invention to detect and locate submarines will be made in reference to FIG. 3 which shows a submarine 30 which has proceeded along a course x—y and has left a trail of exhaust gases O—P. A ship 31 is shown as having a course W—Z which intersects the trail O—P of the submarine 30 at point A. The ship 31 in approaching the trail O—P of the submarine with the detection means of the present invention in operation, would receive progressively increasing indication of the presence of the selected material present in the exhaust gases of the internal combustion engine. When the indication reached a maximum and begins to decline, the ship would have crossed the trail of the submarine and the detecting vessel would maneuver to recross the trail. The point of maximum indication in the detection system would have been somewhere in the vicinity of the course of the submarine. In following out the method of this invention the ship, as soon as it received an indication that the detection signal was decreasing, would alter its course to bring it about and recross the course of the submarine, which will be presumed to have taken place at point B. If point B is farther away from the submarine than point A, the maximum intensity of the signal produced by the detection system would be less at point B than at point A, but as indicated in the present schematic drawing, the signal at point B would be greater than at point A because the ship at B would be closer to the submarine and less dispersion of the exhaust gases would have occurred. Following the detection at point B, the ship 31 would alter its course again to bring it back across the trail of the submarine and would continue such maneuver tactics to follow the trail produced by the submarine. Since the speed of a surface ship is generally considerably higher than that of a submarine, the ship could expect to overtake the submarine and thus locate the submarine.

It will be noted that the trail of exhaust gases from the internal combustion engine of the submarine will be present both in the air and dissolved into the water of the ocean along the course of the submarine. When the submarine is of the snorkel type, the large percentage of the exhaust gases may be expected to be dissolved in the water. Therefore to make the system of the invention more reliable and of greater general utility, there may be installed one intake 10 for air, and another 10' for water with a sampling cell 12, 12' and a mass spectrometer system 14, 14' for each of the intakes with a common display, as shown in FIG. 4. If desired, in the arrangement of FIG. 4, the mass spectrometer may be made common to both sampling cells so that only one mass spectrometer would be needed.

When the apparatus of the present invention is mounted in an airplane the method may be employed to detect and locate other aircraft or submarines, as the case may be.

The apparatus may be used for identification when a distinguishing material is introduced into the trails in the fluid medium from sources of known origin.

Obviously many modifications and variations of the present invention are possible in the light of the above teachings. It is therefore to be understood that the invention may be practiced otherwise than as specifically described.

What is claimed as new and desired to be secured by Letters Patent of the United States is:

1. The method of locating a source of a predetermined gaseous material comprising the steps of taking at a first sequential series of geographically spaced points a first series of samples of a fluid medium containing said material, subjecting each of said samples to a mass spectrographic analysis to determine the quantity of said material present, plotting the location of the point at which the sample of maximum quantity was obtained, taking a second series of samples at a second sequential series of geographical points spaced from said first series, subjecting each of said last named samples to a mass spectrographic analysis, plotting the geographical location at which said second maximum amount of said material was taken, obtaining from the two maximum points the geographical direction of the trail of said material; repeating the above steps until the amount of said material in said samples indicates that said source has been bracketed by the series of samples.

2. The method of claim 1 in which the steps of taking samples and mass spectrographic analysis are a continuous process.

References Cited in the file of this patent

UNITED STATES PATENTS

| | | |
|---|---|---|
| 2,112,845 | Howell | Apr. 5, 1938 |
| 2,132,539 | McRae | Oct. 11, 1938 |
| 2,155,442 | Parkhurst | Apr. 25, 1939 |
| 2,393,650 | Metcalf | Jan. 29, 1946 |
| 2,468,021 | Black | Apr. 26, 1949 |
| 2,508,163 | Hipple | June 3, 1949 |
| 2,610,300 | Walton et al. | Sept. 9, 1952 |
| 2,648,976 | Bur | Aug. 18, 1953 |
| 2,702,479 | Black | Feb. 22, 1955 |
| 2,714,164 | Riggle | July 26, 1955 |